United States Patent
Groff et al.

(10) Patent No.: US 7,847,435 B2
(45) Date of Patent: Dec. 7, 2010

(54) INTRINSICALLY BALANCED DIRECT CURRENT UNINTERRUPTIBLE POWER SUPPLY

(75) Inventors: Steven Mark Groff, Tucson, AZ (US); Trung Le, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 197 days.

(21) Appl. No.: 12/174,381

(22) Filed: Jul. 16, 2008

(65) Prior Publication Data

US 2010/0013311 A1   Jan. 21, 2010

(51) Int. Cl.
*H02J 1/00* (2006.01)
(52) U.S. Cl. .......................... 307/66; 307/64
(58) Field of Classification Search ............. 307/64, 307/66
See application file for complete search history.

(56) References Cited

U.S. PATENT DOCUMENTS

| | | | |
|---|---|---|---|
| 5,920,129 A | 7/1999 | Smith | |
| 6,166,531 A | 12/2000 | Hogan et al. | |
| 6,181,029 B1 | 1/2001 | Berglund et al. | |
| 6,940,187 B2 | 9/2005 | Escobar et al. | |
| 7,456,524 B2 * | 11/2008 | Nielsen et al. | 307/82 |
| 2002/0054497 A1 | 5/2002 | Sato et al. | |
| 2003/0227785 A1 | 12/2003 | Johnson, Jr. | |
| 2007/0210652 A1 | 9/2007 | Tracy et al. | |

FOREIGN PATENT DOCUMENTS

| | | |
|---|---|---|
| CN | 2909689 | 6/2007 |
| EP | 0547418 A2 | 11/1992 |
| EP | 1622248 A2 | 2/2006 |
| JP | 4281339 A | 10/1992 |
| JP | 5146098 A | 6/1993 |
| JP | 9084273 A | 3/1997 |
| JP | 11041836 A | 2/1999 |
| JP | 11275865 A | 10/1999 |

OTHER PUBLICATIONS

International Search Report for corresponding Application No. PCT/EP2009/059061, mailed Oct. 21, 2009.

* cited by examiner

*Primary Examiner*—Robert L. Deberadinis
(74) *Attorney, Agent, or Firm*—Griffiths & Seaton PLLC

(57) ABSTRACT

An intrinsically phase-balanced direct current (DC) uninterruptible power supply (UPS) is provided. The DC UPS includes first, second, and third alternating current (AC) phase inputs. First, second, and third rectifiers are coupled to the first, second, and third AC phase inputs. A common node is coupled to the first, second, and third rectifiers. At least one DC output is coupled to the common node. The at least one DC output is adapted for connection to at least one electrical load. A battery is coupled to the common node. A blocking diode is coupled between the battery and the common node.

20 Claims, 3 Drawing Sheets

INTRINSICALLY BALANCED DIRECT CURRENT UNINTERRUPTIBLE POWER SUPPLY

CROSS-REFERENCE TO RELATED APPLICATIONS

This application is related to U.S. Non-Provisional application Ser. Nos. 12/174,386, 12/174,388, and 12/174,425 filed concurrently herewith and incorporated herein by reference.

BACKGROUND OF THE INVENTION

1. Field of the Invention

The present invention relates in general to power supplies for electronic devices, and more particularly to an apparatus, method, and system for intrinsically phase-balanced direct current (DC) uninterruptible power supplies (UPS) for use in computing environments.

2. Description of the Related Art

An uninterruptible power supply (UPS), also known as an uninterruptible power source, uninterruptible power system, continuous power supply (CPS), or a battery backup is a device which maintains a continuous supply of electrical power to connected equipment by supplying power from a separate source when utility power is not available. A UPS differs from an auxiliary power supply or standby generator, which generally does not provide instant protection from a momentary power interruption.

While not limited to safeguarding any particular type of equipment, a UPS is typically used to protect computers, telecommunications equipment, or other electrical equipment where an unexpected power disruption could cause injuries, business disruption, or data loss. UPS units range in size from units that will back up a single computer to units that will power entire data centers or buildings.

It may be advantageous for equipment in larger settings to take advantage of three-phase power as provided by a utility company. When using three-phase power, however, it is important for each phase to be balanced with the remaining phases to ensure operating efficiency. The phases of a three-phase power service are considered to be balanced when equal current flows in each of the three phase lines (A, B, and C). Utility cost is higher for unbalanced load usage due to reduced efficiency of the power generator.

SUMMARY OF THE INVENTION

In general, to use a UPS in a three-phase power application, such as a direct current (DC) UPS coupled between a phase line and a load, a three-phase front-end power supply having automatic phase balancing may be implemented. The three-phase power supply solution requires a power supply in front of the secondary single-phase power supplies for the equipment. This introduces additional complexity and system cost by requiring additional hardware. Alternatively, single-phase currents may be manually distributed more evenly across the three phases. Manual balancing is, however, an approximate solution that does not work well with dynamically changing loads. Finally, no phase-balancing UPS exists.

In light of the foregoing, a need exists for a UPS that provides phase balancing across three connected phase lines. In addition, it is advantageous that such an UPS does not add significant hardware, complexity or cost to a particular implementation. Accordingly, in one embodiment, by way of example only, an intrinsically phase-balanced direct current (DC) uninterruptible power supply (UPS) is provided. The DC UPS includes first, second, and third alternating current (AC) phase inputs. First, second, and third rectifiers are coupled to the first, second, and third AC phase inputs. A common node is coupled to the first, second, and third rectifiers. At least one DC output is coupled to the common node. The at least one DC output is adapted for connection to at least one electrical load. A battery is coupled to the common node. A blocking diode is coupled between the battery and the common node.

In an additional embodiment, again by way of example only, a method for intrinsically phase-balancing three-phase line current inputs for distribution to at least one electrical load in a direct current (DC), uninterruptible power supply (UPS) is provided. Each of the three-phase line currents are coupled to a common node. First, second, and third rectifiers are coupled between each of the three-phase line current inputs and the common node. At least one DC output is coupled to the common node. The at least one DC output is adapted for connection to the at least one electrical load. A battery is coupled to the common node. A blocking diode is coupled between the battery and the common node.

In an additional embodiment, again by way of example only, a system for intrinsic phase-balancing of three-phase line currents for distribution to at least one electrical load is provided. A first direct current (DC) uninterruptible power supply (UPS) is provided. The first DC UPS includes first and second rectifiers coupled between first and second inputs and a first common node, and first and second outputs coupled to the first common node. A second DC UPS having a third input is coupled to the second output of the first DC UPS. The second DC UPS includes third and fourth rectifiers coupled between the third input, a fourth input and a second common node, and third and fourth outputs coupled to the second common node. A third DC UPS having a fifth input is coupled to the fourth output of the second DC UPS. The third DC UPS includes fifth and sixth rectifiers coupled between the fifth input, a sixth input and a third common node, and fifth and sixth outputs coupled to the third common node. The second input of the first DC UPS is coupled to a first phase line current. The fourth input of the second DC UPS is coupled to a second phase line current. The sixth input of the third DC UPS is coupled to a third phase line current, and the sixth output of the third DC UPS is coupled to the first input of the first DC UPS.

In still an additional embodiment, again by way of example only, a method of manufacturing an intrinsically phase-balanced direct current (DC) uninterruptible power supply (UPS) is provided. First, second, and third alternating current (AC) phase inputs are provided. First, second, and third rectifiers coupled to the first, second, and third AC phase inputs are provided. A common node coupled to the first, second, and third rectifiers, is provided. At least one DC output coupled to the common node is provided. The at least one DC output adapted for connection to at least one electrical load. A battery coupled to the common node is provided. A blocking diode coupled between the battery and the common node is provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for balancing three-phase line currents in a DC UPS and distributing power to one or more connected electrical loads. The illustrated embodiments may be combined in specific network configurations to allow balancing of the input currents. The embodiments rectify, combine, and distribute the three phases to all the loads. Any number of DC UPS units as described below may be used, so long as all three phases are connected to at least one of the inputs of the DC UPS units in the network.

Figure 1:
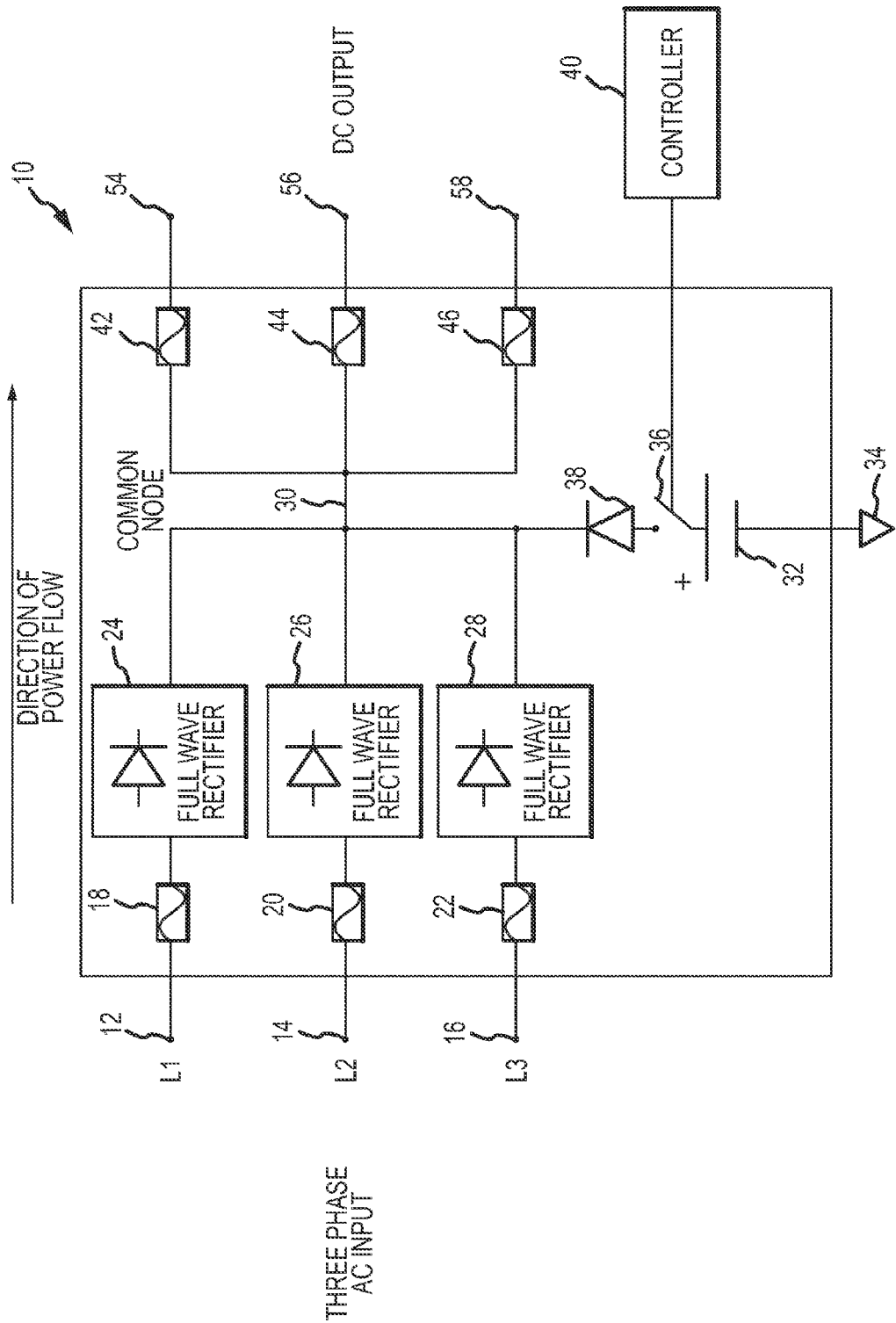
FIG. 1 is a schematic diagram of a first exemplary direct current uninterruptible power supply (DC UPS)

Turning to FIG. 1, an exemplary DC UPS 10 is illustrated for intrinsically balancing three phase input line currents. It should be appreciated, however, that FIG. 1 is only exemplary and is not intended to state or imply any limitation as to the particular architectures in which the exemplary aspects of the illustrative embodiments may be implemented. Many modifications to the architecture depicted in FIG. 1 may be made without departing from the scope and spirit of the following description and claimed subject matter.

DC UPS 10 includes three alternating current (AC) inputs 12, 14, and 16, one for each phase of a three-phase (ABC) power system. While AC is shown for inputs 12, 14, and 16, the inputs may also accept DC or rectified AC power. Each of the AC inputs 12, 14, and 16 are coupled to circuit protection devices 18, 20, 22. Circuit protection devices 18, 20, and 22 may, as one skilled in the art will anticipate, vary for a particular implementation. For example, circuit protection devices 18, 20, and 22 may include fuses, fuse elements, fusible links, circuit breakers, and the like as the skilled artisan will expect.

Circuit protection devices 18, 20, and 22 are each coupled to a rectifier. In the depicted embodiment, full wave rectifiers 24, 26, and 28 are shown coupled to circuit protection devices 18, 20, and 22. The full wave rectifiers 24, 26, and 28 are coupled to a common node 30.

A battery 32 supplies backup current in the event of a power disruption. Battery 32 is coupled between ground 34 and a disconnect switch 36. Disconnect switch 38 is in turn coupled to a blocking diode 38. Disconnect switch 38 may be actuated by a controller 40. For example, disconnect switch 38 may be a relay or a similar device. Controller may provide a control signal to the disconnect switch 38 upon a detection of a power disruption from one or more of the inputs 12, 14, and 16. As one skilled in the art will expect, disconnect switch 38 may include transistor devices, such as metal oxide semiconductor field effect transistors (MOSFETs).

Circuit protection devices 42, 44, and 46 are shown coupled to the common node 30, and correspond to one of three DC outputs 54, 56 and 58. DC outputs 54, 56, and 58 are adapted for connection to at least one electrical load. The connected load(s) are shared between the outputs 54, 56, and 58. Circuit protection devices 42, 44, and 46 may again include fuse and circuit breaker devices as previously described to isolate load faults.

DC UPS 10 rectifies three-phase input currents (input 12, input 14, and input 16). The outputs of each of the rectified currents are combined at common node 30. Inputs 12, 14, and 16 are rectified, then combined at common node 30. After the inputs are rectified, they may be combined independently of phase, frequency, or magnitude of the individual inputs.

DC UPS 10 uses a highly efficient and cost-effective method of intrinsic phase balancing. In addition, the method provides high energy density. There is no need for output synchronization or communication between multiple DC UPS units. Phases from differing power feeds may be combined. The intrinsic balancing operates from light to full load, and operates independently of changing load conditions.

Figure 2:
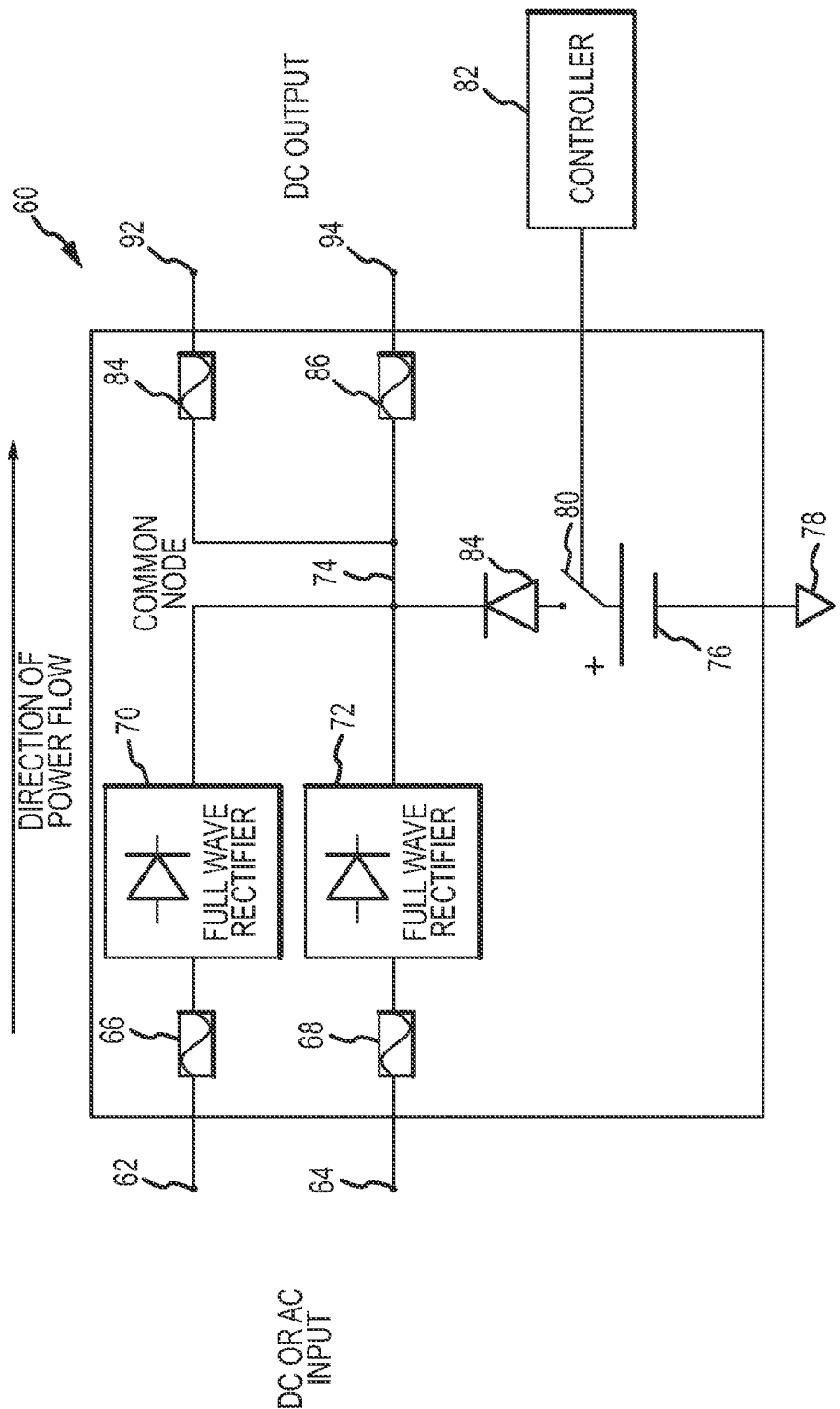
FIG. 2 is a schematic diagram of a second exemplary DC UPS.

An example of DC UPS units 10 that may be configured into a network that allows for intrinsic balancing of phase currents is illustrated in FIG. 2, following. DC UPS 60 is configured with a first DC or AC input 62. DC UPS 60 is also configured with a second DC or AC input 64. Input 62 may correspond to a first phase line input (e.g., A), while input 64 may correspond to a second phase line input (e.g., B). Input 62 is coupled through a circuit protection device 66 similar to those previously described to a rectifier. Again, in the depicted example, a full wave rectifier 70 is implemented. Similarly, input 64 is coupled through a circuit protection device 68 to full wave rectifier 72.

Each full wave rectifier is coupled to common node 74, where rectified currents are combined as previously described. A battery 76 is coupled between ground 78 and a controllable disconnect switch 80 in communication with controller 82, while blocking diode is coupled between the common node 74 and the disconnect switch 80. Battery 76, disconnect switch 80, and blocking diode 84 may function in a manner similar to battery 32, disconnect switch 36, and blocking diode 38 (FIG. 1).

Two DC outputs 92 and 94 are coupled to disconnect switches 88 and 90, respectively. Each of the DC outputs 92 and 94 are configured for connection to at least one electrical load, or to another DC UPS unit 60 as will be further described. Circuit protection devices 84 and 86 are coupled to the common node 74. Here, as in FIG. 1, circuit protection devices 84 and 86 may include components similar to circuit protection devices 42, 44, and 46 (FIG. 1).

Figure 3:
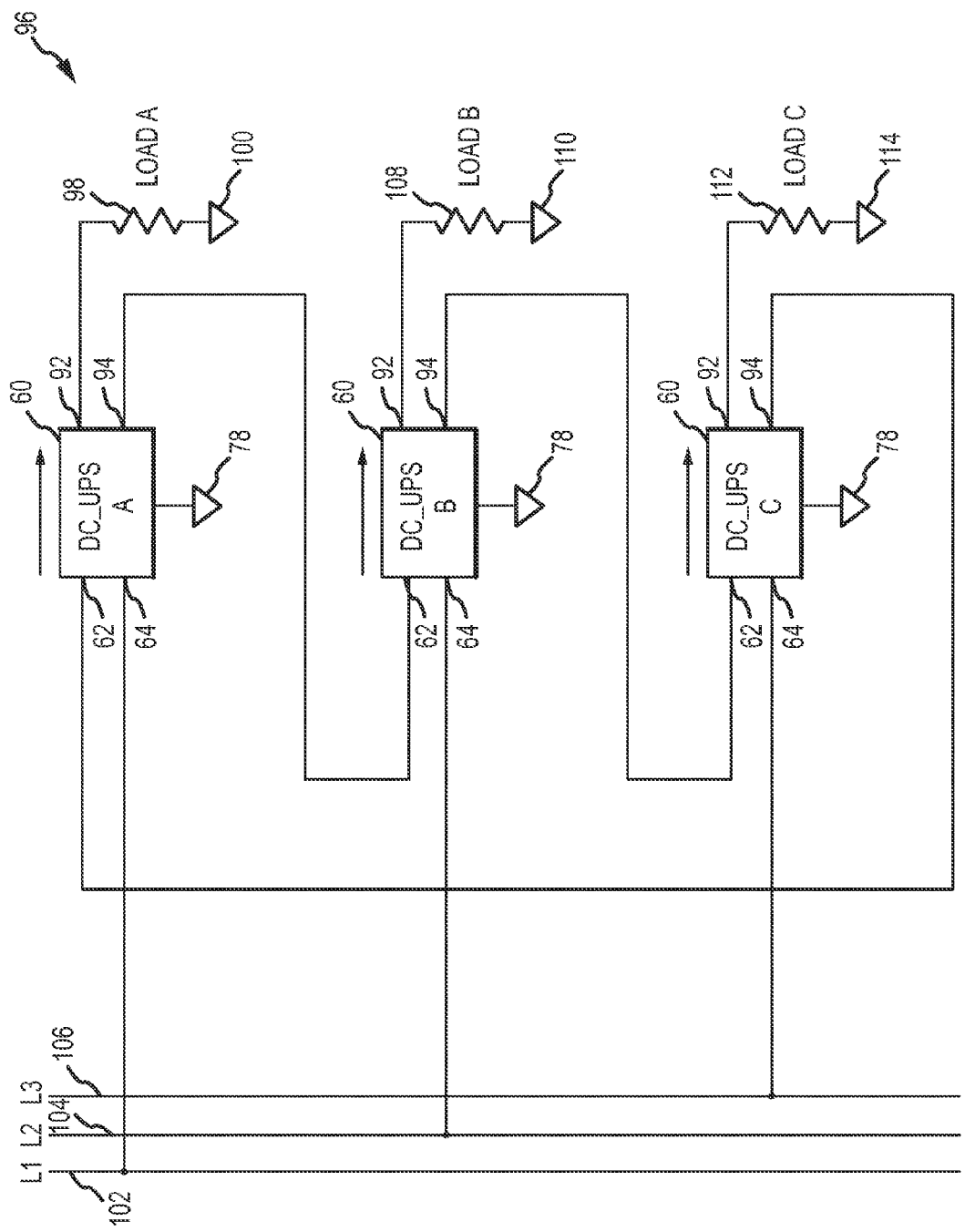
FIG. 3 is a schematic diagram of a system of interconnected DC UPS units.

DC UPS units 60 may be interconnected into a network 96 as shown in FIG. 3 that allows balancing of the phase currents. In the depicted embodiment, each DC UPS 60 is fed from a different phase. The three DC UPS units 60 are connected in a loop. The output of each DC UPS 60 feeds power to the input of the next DC UPS 60 in the loop. All three-phase currents to the DC UPS units 60 are rectified, combined into a common node through Or-ing diodes, and then distributed to the load(s) through the DC UPS 60 units connected in the loop.

As shown, a first input line current 102 having a first phase (e.g., A) is coupled to input 64 of a first DC UPS 60. The output 92 of the first DC UPS 60 in the loop is coupled through load 98 to ground 100. The output 94 of the first DC UPS 60 is coupled to input 62 of a second DC UPS 60. The opposing input 64 of the second DC UPS 60 is coupled to a second input line current 104 having a differing phase (e.g., B). Output 92 of the second DC UPS 60 is coupled through load 108 to ground 110. Output 94 is coupled to the input 62 of a third DC UPS, while the input 64 is coupled to a third input line current having a differing phase (e.g., C). Output 92 of the third DC UPS 60 is coupled through load 112 to ground 114, while output 94 is coupled to input 62 of the first DC UPS 60, forming the loop previously described. Each load 98, 108, and 112 is shared between each of the DC UPS 60 units in the network, while all phase input currents are intrinsically balanced and output to the shared loads 98, 108, and 112. While three DC UPS units are shown connected in a loop, any number of DC UPS units 60 may be implemented in a particular network, so long as one output of a last DC UPS unit is coupled to an input of the first.

While one or more embodiments of the present invention have been illustrated in detail, the skilled artisan will appreciate that modifications and adaptations to those embodiments may be made without departing from the scope of the present invention as set forth in the following claims.

What is claimed is:

1. An intrinsically phase-balanced direct current (DC) uninterruptible power supply (UPS), comprising:
    a first alternating current (AC) phase input;
    a second AC phase input;
    a third AC phase input;
    a first rectifier including a first output and a first input coupled to the first AC phase input, the first rectifier configured to rectify the first AC phase input;
    a second rectifier including a second output and a second input coupled to the second AC phase input, the second rectifier configured to rectify the second AC phase input;
    a third rectifier including a third output and a third input coupled to the third AC phase input, the third rectifier configured to rectify the third AC phase input;
    a common node directly coupled to the first output, the second output, and the third output, the common node configured to combine the rectified first AC phase input, the rectified second AC phase input, and the rectified third AC phase input;
    a first DC output coupled to the common node, the first DC output configured to coupled the DC UPS to a first electrical load;
    a second DC output coupled to the common node, the second DC output configured to couple the DC UPS to a second electrical load;
    a third DC output coupled to the common node, the second DC output configured to couple the DC UPS to a third electrical load;
    a battery; and
    a switch coupled between the battery and the common node, wherein the switch and the battery are configured to selectively provide back up power to the common node in an event of a power loss from one or more of the first AC phase input, the second AC phase input, and the third AC phase input.

2. The DC UPS of claim 1, wherein the first, second, and third rectifiers are full wave rectifiers.

3. The DC UPS of claim 1, further including a blocking diode coupled between the common node and the switch.

4. The DC UPS of claim 3, wherein the switch coupled between the battery and the blocking diode is adapted for connection to a controller for actuating the switch in the event of the power loss.

5. The DC UPS of claim 1, further including one of a circuit protection device coupled between the battery and the common node, and a circuit protection device coupled between the common node and one of the first, second, and third DC outputs.

6. A method for intrinsically phase-balancing three-phase line current inputs for distribution to a plurality of electrical loads in a direct current (DC), uninterruptible power supply (UPS), comprising:
    coupling each of the three-phase line current inputs to a common node;
    coupling first, second, and third rectifiers between each of the three-phase line current inputs and the common node, the first, second, and third rectifiers directly coupled to the common node;
    coupling first, second, and third DC outputs to the common node;
    coupling the first DC output to a first electrical load;
    coupling the second DC output to a second electrical load;
    coupling the third DC output to a third electrical load;
    coupling a battery to the common node; and
    coupling a switch between the battery and the common node.

7. The method of claim 6, further including coupling a blocking diode between the battery and the switch.

8. The method of claim 7, further including adapting the switch coupled between the battery and the blocking diode for connection to a controller for actuating the switch upon a power loss.

9. The method of claim 6, wherein coupling first, second, and third rectifiers between each of the three-phase line current inputs and the common node includes coupling first, second, and third full wave rectifiers between each of the three-phase line current inputs and the common node.

10. The method of claim 6, further including one of coupling a circuit protection device between the battery and the common node, and coupling a circuit protection device between the common node and one of the first, second, and third DC outputs.

11. A method of manufacturing an intrinsically phase-balanced direct current (DC) uninterruptible power supply (UPS), comprising:
    providing first, second, and third alternating current (AC) phase inputs;
    providing first, second, and third rectifiers coupled to the first, second, and third AC phase inputs;
    providing a common node directly coupled to the first, second, and third rectifiers;
    providing first, second, and third DC outputs coupled to the common node, the first, second, and third DC outputs configured to be coupled to first, second, and third electrical loads, respectively;
    providing a battery; and
    providing a switch coupled between the battery and the common node, wherein the switch and the battery are configured to selectively provide back up power to the common node in an event of a power loss from one or more of the first, second, and third AC phase inputs.

12. The method of manufacture of claim 11, wherein providing the first, second, and third rectifiers includes providing first, second, and third full wave rectifiers.

13. The method of manufacture of claim 11, further including providing a blocking diode coupled between the common node and the switch.

14. The method of manufacture of claim 13, wherein providing the switch coupled between the battery and the blocking diode includes adapting the switch for connection to a controller for actuating the switch upon a power loss.

15. The method of manufacture of claim 11, further including providing one of a circuit protection device coupled between the battery and the common node, and a circuit protection device coupled between the common node and one of the first, second, and third DC outputs.

16. A system for intrinsic phase-balancing of three-phase line currents for distribution to at least one electrical load, comprising:
    a first power supply;
    a second power supply;

a third power supply
a first direct current (DC) uninterruptible power supply (UPS) comprising:
  a first input coupled to the first power supply,
  a second input,
  a first rectifier coupled to the first input,
  a second rectifier coupled to the second input,
  a first common node directly coupled to the first rectifier and the second rectifier,
  a first battery,
  a first switch coupled between the first common node and the first battery,
  a first output coupled to the first common node and configured to be coupled to a first electrical load, and
  a second output coupled to the first common node;
a second DC UPS comprising:
  a third input coupled to the second power supply,
  a fourth input coupled to the second output,
  a third rectifier coupled to the third input,
  a fourth rectifier coupled to the fourth input,
  a second common node directly coupled to the third rectifier and the fourth rectifier,
  a second battery,
  a second switch coupled between the second common node and the second battery,
  a third output coupled to the second common node and configured to be coupled to a second electrical load, and
  a fourth output coupled to the second common node; and
a third DC UPS comprising:
  a fifth input coupled to the third power supply,
  a sixth input coupled to the fourth output,
  a fifth rectifier coupled to the fifth input,
  a sixth rectifier coupled to the sixth input,
  a third common node directly coupled to the fifth rectifier and the sixth rectifier,
  a third battery,
  a third switch coupled between the third common node and the third battery,
  a fifth output coupled to the third common node and configured to be coupled to a third electrical load, and
  a fourth output coupled to the second common node and the second input.

17. The system of claim 16, wherein each of the first, second, and third DC UPS further comprises a first, second, and third blocking diode, respectively, coupled between the first, second, and third batteries and the first, second, and third common nodes, respectively.

18. The system of claim 17, wherein each of the first, second, and third switches coupled between the first, second, and third batteries and the first, second, and third blocking diode diodes of the first, second, and third DC UPS are adapted for connection to a first, second, and third controller, respectively, for actuating the first, second, and third switches upon a power loss.

19. The system of claim 16, wherein the first and second rectifiers of each of the first, second, and third DC UPS are full wave rectifiers.

20. The system of claim 16, wherein each of the first, second, and third DC UPS further includes one of a circuit protection device coupled between the first, second, and third batteries and the first, second, and third common nodes, respectively, and a circuit protection device coupled between the first, second, and third common nodes and the first, third, and fifth outputs.

* * * * *